(No Model.)
E. B. STUART.
MANGANATE AND PROCESS OF PRODUCING SAME.
No. 588,614. Patented Aug. 24, 1897.
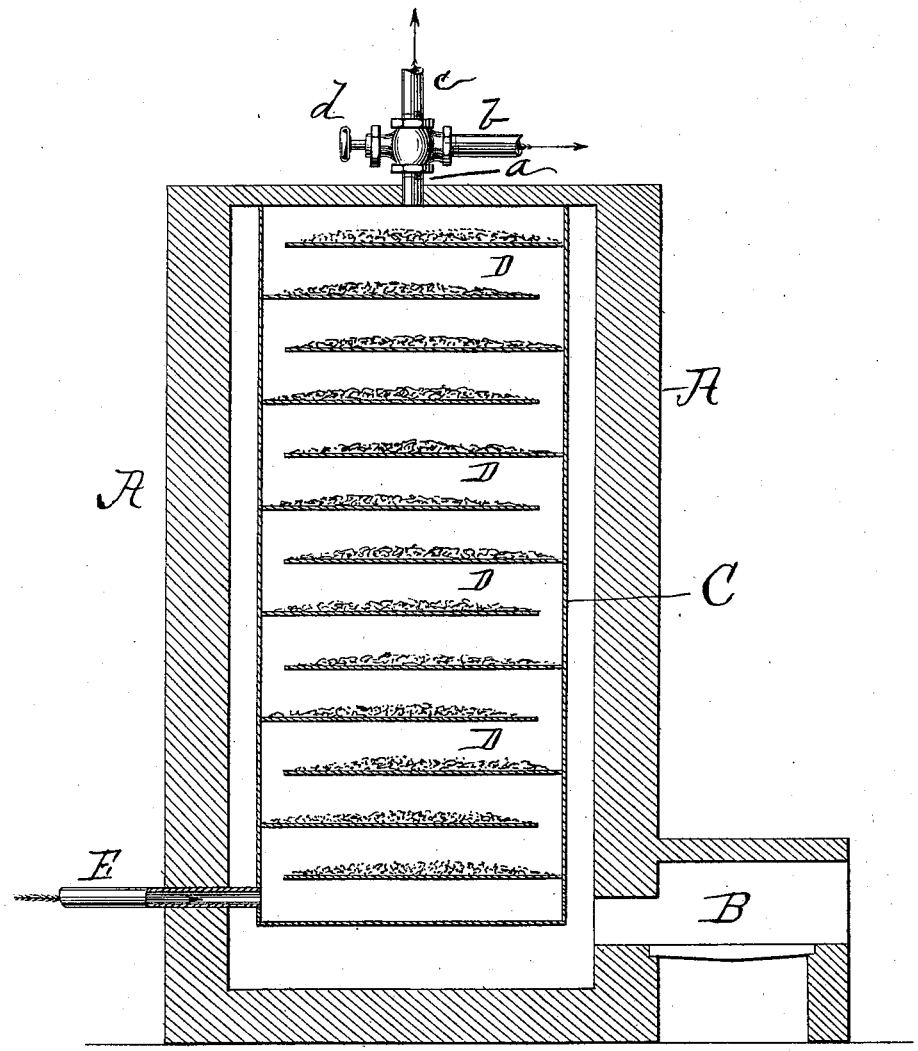
Witnesses:
V. W. Middleton
J. J. Newton
Inventor:
Ernest B Stuart
By Elliott & Hopkins
Attorneys

UNITED STATES PATENT OFFICE.

ERNEST B. STUART, OF CHICAGO, ILLINOIS, ASSIGNOR TO THE GENERAL GAS COMPANY, OF SAME PLACE.

MANGANATE AND PROCESS OF PRODUCING SAME.

SPECIFICATION forming part of Letters Patent No. 588,614, dated August 24, 1897.

Application filed November 23, 1895. Renewed December 24, 1896. Serial No. 616,943. (No specimens.)

*To all whom it may concern:*

Be it known that I, ERNEST B. STUART, a citizen of the United States, residing at Chicago, in the county of Cook and State of Illinois, have invented certain new and useful Improvements in Manganates and Processes of Producing Double Manganates for Obtaining Oxygen and Nitrogen, of which the following is a full, clear, and exact specification.

In an application filed of even date herewith, Serial No. 569,944, entitled "Improvements in methods of producing manganate of soda and other manganates for obtaining oxygen and nitrogen," I have disclosed a discovery and invention by which a mass of manganate of soda may in granular form be subjected to the alternate action of air and steam for an indefinite time for producing oxygen from the air without being dissolved and with an absence of any change in its physical condition and chemical nature.

The object of this invention is to produce a manganate, which I shall term a "double" manganate, having the same characteristics, insolubility, and unchangeability, and therefore capable of use in the granular form, as the manganate before referred to without the employment of an excessive temperature and with the employment of a temperature not higher than that commonly used for manganates generally.

In carrying out my invention I preferably form the double manganate from two equivalents of sodium, one equivalent of calcium, two equivalents of manganese, and eight equivalents of oxygen, preferably prepared by weight from eighty parts of pure caustic soda, fifty-six parts of pure oxid of calcium, eighty-eight parts of pure binoxid of manganese or their equivalents, and one hundred and twenty-eight parts of oxygen subjected to a temperature of between 300° and 400° centigrade, which double manganate, ($CaNa_2Mn_2O_8$,) excluding impurities, and in which it seems probable that two atoms of manganese are linked together by means of the dyad atom of calcium, perhaps as shown in this graphic formula:

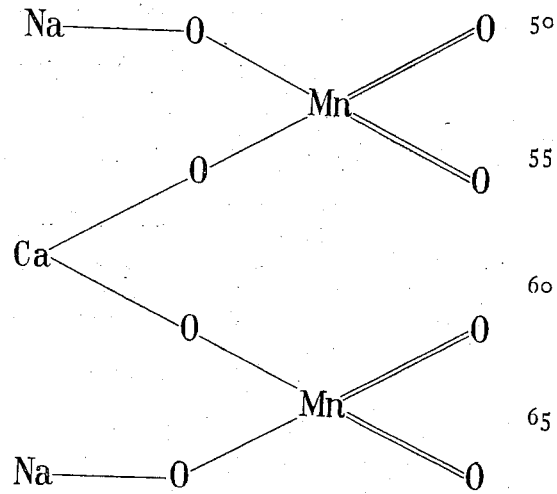

This salt, when so formed, is ready for use at the same temperature and is preferably used in a granular form for the purpose of securing the largest possible surface exposure to air and steam. I have found, however, that by the addition of from five to fifteen per cent. more of caustic soda to this double manganate—that is to say, about sixteen pounds of pure caustic soda to the formula above indicated—oxygen combines and is evolved with greater freedom than with the pure double manganate.

While I prefer to use the materials above set forth, it would be no substantial departure from my invention to substitute caustic potash for caustic soda. For calcium I may also substitute corresponding salts of barium or magnesium, and possibly strontium, and for manganese any of the other oxids or salts which may be found to be suitable for the purposes of producing a double manganate.

In the practice of my invention I may use any suitable vessel in which the solid materials may be subjected to the necessary temperature to form a double manganate, but instead of completing the oxidation therein the oxidation may be completed after the materials are transferred to a suitable retort provided with pipes and adapted for producing oxygen and nitrogen for commercial use.

A suitable retort-furnace is shown in the accompanying drawing in vertical section, in which A indicates the walls of the furnace, and B the fire-chamber thereof, in which furnace is suspended a closed retort C, having arranged therein a series of shelves D, upon which the manganate in angular form is placed and back and forth over which air and steam are supplied alternately through the pipe E may be circulated. Opening in the top of this retort is a three-way pipe consisting of the members $a\ b\ c$, respectively, having therein a three-way cock, as indicated at $d$, of any ordinary construction, whereby in forming the manganate by the introduction of air to the granular chemical nitrogen may be discharged through the pipe $c$, while in the meantime the pipe $b$ is closed and oxygen discharged through the pipe $b$ when the pipe $c$ is closed and during the action of steam on the manganate; but, as before stated, any other form of apparatus may be used which will enable the performing of my process as above indicated.

Having thus described my invention, what I claim as new therein, and desire to secure by Letters Patent, is—

1. A double manganate of sodium and calcium containing sodium, calcium, manganese, and oxygen, substantially as set forth.

2. A chemical preparation including a double manganate of sodium and calcium sodium, calcium, and manganese and an excess of caustic soda, substantially as set forth.

3. The herein-described method of producing a double manganate, the same consisting in subjecting sodium hydrate, calcium oxid and oxid of manganese to a temperature at which reaction takes place, substantially as set forth.

ERNEST B. STUART.

Witnesses:
C. S. CORNING,
F. A. HOPKINS.